United States Patent [19]

Ladzinski

[11] Patent Number: 5,309,667
[45] Date of Patent: May 10, 1994

[54] LACCHIA LEG SNARE

[76] Inventor: Matthew Ladzinski, 112 Hardwick Ave., Westfield, N.J. 07090

[21] Appl. No.: 54,222

[22] Filed: Apr. 30, 1993

[51] Int. Cl.⁵ .......................................... A01M 23/34
[52] U.S. Cl. .......................................... 43/87; 43/85
[58] Field of Search ................. 43/85, 86, 87, 135, 43/67

[56] References Cited

U.S. PATENT DOCUMENTS

| | | | |
|---|---|---|---|
| 1,861,312 | 5/1932 | Magee et al. | 43/87 |
| 2,894,352 | 7/1959 | McDonald | 43/87 |
| 3,416,257 | 12/1968 | Dahlgren | 43/87 |
| 4,208,827 | 6/1980 | Starkey | 43/87 |
| 4,633,610 | 1/1987 | Thompson | 43/85 |
| 5,062,237 | 11/1991 | Kitagawa et al. | 43/87 |

*Primary Examiner*—Kurt C. Rowan
*Assistant Examiner*—Chuck Y. Mah
*Attorney, Agent, or Firm*—Edward M. Fink

[57] ABSTRACT

A leg snare device is described for catching animals by their front leg. The described device includes a steel cable snare attached to a torsion spring that is encased within a tapered plastic tubing. The snare is constructed in such manner that it reduces the likelihood of the animals escape while holding the animal by the front leg without causing serious injury to the animal.

5 Claims, 3 Drawing Sheets

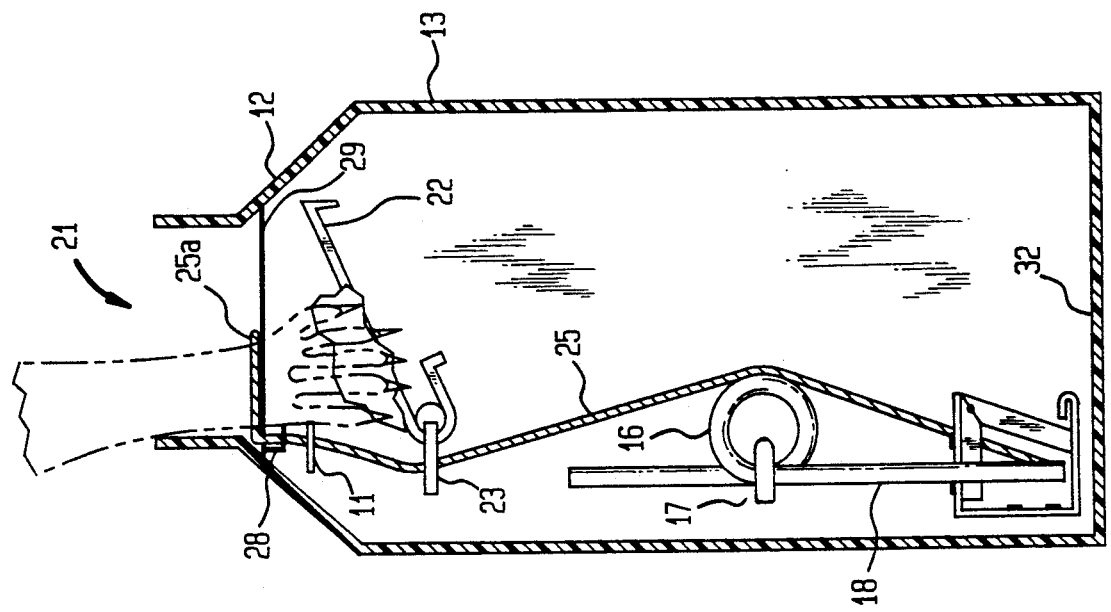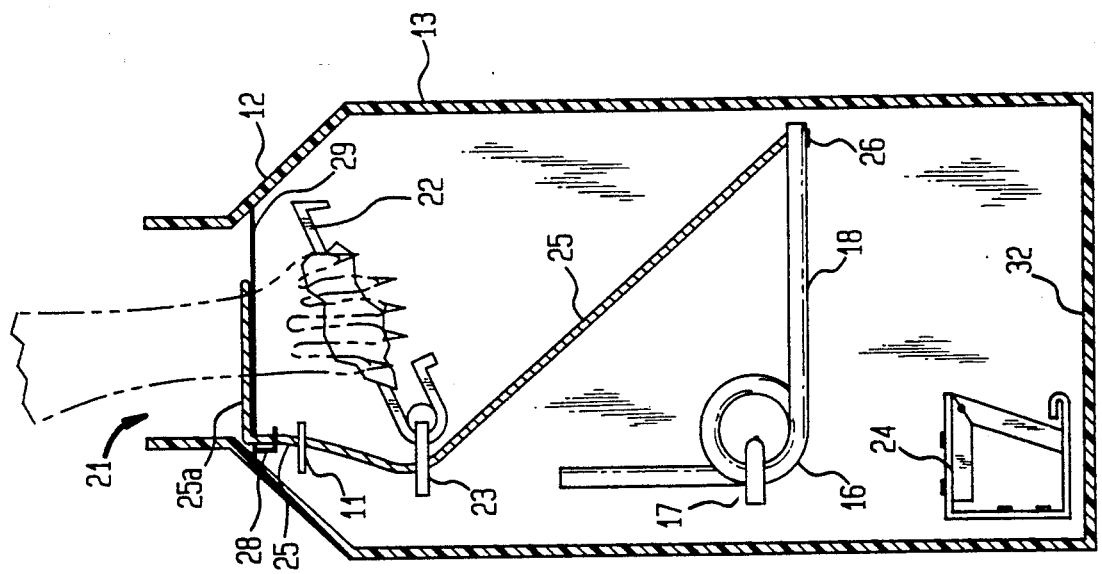

LACCHIA LEG SNARE

FIELD OF THE INVENTION

The present invention relates to a device for catching animals by the front leg. More specifically, the present invention relates to a device for catching animals which includes a steel cable snare that is attached to a torsion spring and encased in a tube. The described device is capable of catching and holding an animal by its front leg.

BACKGROUND OF THE INVENTION

In the field of trapping, there are a number of devices that are suitable for trapping and holding an animal by its leg. The most commonly used device for this purpose is referred to as the steel jaw leg hold trap. This type of device has been used successfully for many years. However, the steel jaw leg hold traps frequently cause serious injury to the leg and foot of the trapped animal. This type of injury may occur either upon impact of the jaws clamping around the animal leg or foot during which the bones in these appendages may be broken or due to the limitation of circulation to appendages below the trap jaws with the concomitant loss of feeling. Once an animal has been trapped, studies reveal that it is common for the animal to chew upon the trap in an effort to gain freedom and in this process the animal will often chew its foot below the trap jaws without realizing it due to the loss of feeling in the appendage. Furthermore, several states have banned the use of steel jaw leg hold traps and have limited trappers to the use of body gripping snares.

Body gripping snares employed for this purpose are commonly constructed of galvanized steel aircraft cable. The snare forms a loop which closes around the body of an animal as the animal passes therethrough. The forward motion of the animal causes the snare to close tightly around the body in a manner similar to that of a choker chain used for dogs. The snares may also be adapted with a lock to prohibit the loop from opening once it has closed around the body of the animal.

The most productive set when using snares requires a trail which is used by the animal being sought. The opened snare loop, which is supported by a length of wire, is hung in the center of the trail of interest. The unsuspecting animal walks down the trail and through the loop which in turn gets hung up on the animal and closes around its body. In order to assure a tight closure of the loop, there must be continued forward motion by the animal. The snare is anchored to a heavy object or staked so that the animal cannot escape after being caught.

Although body gripping snares of this type have proven effective as a means for trapping animals, their use has been limited by the lack of active trails. Furthermore, body gripping snares can often prove to be fatal if an animal is snared around the neck. And lastly, it is common to snare unwanted animals with such devices due to the fact that different animals frequent trails. These limitations have led to the development and use of numerous leg snaring devices.

PRIOR ART

Before discussing the prior art which typifies this field, it is important to understand that the function of an animal trap is not only to catch or trap the animal but also to assure that the animal does not escape after it has been caught. The following patent literature typifies devices in common use for this purpose.

U.S. Pat. No. 4,555,863 discloses a leg snare comprising an outer frame and a spring activated inner frame. The inner frame pivots around an axis which is connected to the outer frame. This axis allows the inner frame to rotate 180 degrees. A latch, which is connected to a trigger plate, holds the inner frame down when the trap is set. A snare is shown attached to the outer frame and forms a loop above and around the trigger plate. The trap is activated when an animal steps on the trigger plate, thereby releasing the inner frame which swings upward. This motion closes the snare around the leg of the animal.

U.S. Pat. No. 4,581,843 discloses a leg snare that includes a 90 degree coil spring having an eye on the free end of its upper arm. A cable, which is connected to the free end of its lower arm, extends through the eye and forms the loop of the snare. This loop encircles the trigger mechanism which holds the two arms together under tension when the spring is compressed. The trap is activated when an animal steps on the trigger mechanism. This releases the spring arms and throws the snare upwards and around the leg of the animal.

U.S. Pat. No. 4,581,844 discloses a leg snare similar to that disclosed in the preceding patent. The prime difference is that the upper arm of the spring used in this trap is ring shaped. The snare is attached to the lower arm and the snare loop is held in place by the ring shaped arm. The trigger mechanism is identical and operates in a similar fashion.

Although the aforementioned leg snares have been used successfully in snaring animals by the leg, they have been found to have inherent limitations.

Thus, for example, it is a major concern of trappers to avoid catching unwanted or non-target animals. The most common of the non-target animals is the dog. The foregoing traps readily catch dogs because once set they are exposed to any animal that walks by. The loop of the snares employed in these devices is normally of a large diameter, thereby making it easy for a dog to step into the loop, onto the trigger, and be caught.

Another undesirable characteristic of the noted prior art leg snares resides in the fact that the snare cable is always exposed to the animal after a catch is made. Consequently, any animal that is caught in the trap will chew at the trap in an attempt to escape. Animals are fully capable of chewing through a snare cable and by so doing will facilitate their escape. This leads to still another undesirable aspect of leg snares.

As noted above, steel jaw leg hold traps tend to cut off circulation to appendages below the jaws of the trap. Similarly, circulation to the appendages below the snare can also be stopped and when an animal begins to chew the snare cable the possibility arises of the animal chewing off part of its appendage, so resulting in serious injury.

A still further example of a leg snare is the Snare Trap with a Tubular Body shown in U.S. Pat. No. 4,601,128. This device comprises a hollow elongated body, a wire or cable snare equipped with a lock which enables a loop of various sizes to be formed which encircles an interior cross section of the body. A spring powered spring arm is mounted on the exterior of the body to which the free end of the snare cable is attached. A trigger, mounted on the interior of the body, extends through the interior, and attaches to the spring arm.

The trigger holds the spring arm in tension and also releases the spring arm when pulled upwards. Once released the spring arm swings away from the body and in so doing pulls the snare cable and closes the loop around the leg of the animal.

This leg snare, unlike the others previously alluded to, conceals the snare loop inside a tubular body, thereby precluding the foot of a larger animal from being able to reach inside and get caught. However, once caught, an animal can pull its leg out of the tubular body, thereby exposing the snare cable. When this occurs, the animal will undoubtedly chew the snare cable and escape or chew its foot in the process and cause serious damage.

Another limitation of this patent is that it can only be set in essentially open areas. This is apparent because the spring arm is mounted to the exterior of the body. Because of this, space is needed for the spring arm to swing away from the body in order to pull the snare cable far enough for the snare loop to close tightly around the leg of the animal. As a result, set locations are limited to those made above ground in essentially open areas.

SUMMARY OF THE INVENTION

It is an object of the present invention to provide a leg snare that will catch and hold an animal by the front leg without causing serious injury to the animal.

It is also an object of the present invention to provide a leg snare that will afford the trapper a wider variety of setting locations.

Another object of the present invention is to provide a leg snare that is constructed such that it will reduce the likelihood of escape once an animal is caught.

A further object of the present invention is to provide a leg snare that will greatly reduce the chances of catching unwanted animals, especially dogs.

Still another object of the present invention is to provide a leg snare that is simple to set and does not require the use of tools to set.

Yet another object of the present invention is to provide an effective alternate to steel jaw leghold traps for use by trappers in areas where steel jaw leghold traps have been banned.

The foregoing objects may successfully be achieved by means of a snare trap comprising a spring powered steel cable snare which is enclosed in a polyvinylchloride (PVC) plastic tube. The tube, referred to as the casing, is desirably of the order of 11.75 inches in length and approximately 3.0 inches in diameter at the base and 1.5 inches in diameter at the top. The casing is tapered to this value at the top of the device by means of a suitable (3.0×1.5") reducing PVC coupling, which is permanently affixed to the 3.0 inch diameter casing. The top of the casing is open to allow an animal to reach into the casing which is sealed at the bottom. Furthermore, the 3.0 inch diameter portion of the casing is cut laterally in half beginning at the base of the coupling and is fitted with hinges to allow the casing to be opened, thereby exposing the interior thereof. The leg snaring device, which is mounted upon the interior wall of the casing, is constructed of a steel torsion spring having one arm that is capable of rotating 180 degrees inside the closed 3.0 inch diameter portion of the casing. This arm, referred to as the rotation arm, is bent at a right angle at the point at which the arm comes closest to but does not touch the interior wall of the casing when its angle of rotation is at 90 degrees. The bent section of the rotation arm is parallel to the coils of the spring and has a small loop positioned at its distal end. The torsion spring is mounted upon the interior wall of the casing by means of a modified "U" bolt which passes through the coils and is mounted upon the interior wall. Also included in the leg snaring device is a heavy wire trigger which is attached to the interior wall of the casing by means of an eye screw at a distance of approximately 3.5 inches below the 1.5 inch opening at the top of the casing. The function of this trigger is twofold, namely, to hold the rotation arm of the torsion spring in the "set" position after it has been pushed upwards to an angle of approximately 0 degrees in preparation for setting the snaring device, and to hold the bait for which an animal will reach through the top opening to secure. Further included as part of the leg snaring device is a miniature steel cable measuring approximately 11 inches in length and which possesses a one-way sliding lock. This lock is conveniently constructed of a small diameter steel washer that is bent at a near 90 degree angle. A 1/16 inch hole is drilled in the center of each half of the lock. The cable is threaded through the two holes to then form a snare loop that is approximately 1.75 inches in diameter. The lock is attached to the end of the cable by means of an aluminum stop that is crimped on the cable. The stop prevents the lock from being pulled off the cable. The snare loop rests on a steel 1.5 inches inner diameter reducing washer that is mounted to the interior of the reducing coupler just below the top of the opening. The snare loop is not visible when looking through the top opening of the casing because the diameter thereof is larger than that of the opening. The free end of the cable extends downward through the eye of an eye screw mounted to the interior wall of the reducing coupling just below the reducing washer and continues downward through the loop on the rotation arm of the torsion spring when it is in the "set" position. An aluminium stop is crimped to the free end of the cable to keep it from being pulled back through the loop on the rotation arm. The "leg snaring device" is further adapted with a spring lock, This lock is constructed of a "U" shaped piece of steel that is approximately 0.5 inch in width and 0.125 inch in thickness. The arms of the "U" are approximately 1.25 inches high and the gap between the arms is approximately 1 inch. A toggle bolt wing is attached to the interior wall of one of the arms. The wing of the toggle bolt is positioned such that the free arm of the wing hits the opposite arm of the "U". The spring action of the toggle bolt wing then enables the free arm to collapse downward when pressure is applied thereto but will spring back up again and strike the opposite wall of the "U" when released. The spring lock is mounted to the center of the interior wall of the casing approximately 1 inch from the base. When the rotation arm of the torsion spring is released from the "set" position as a result of an animal pulling up on the baited trigger, it "snaps" back down. Accordingly, the 90 degree bend then strikes the free arm of the toggle bolt wing, so causing the wing to collapse and spring back as the rotation arm becomes entrapped in the spring lock. This prohibits the animal from pulling its snared leg out of the casing.

Once the trap is set, the hinged tube is closed, thereby concealing all parts of the snaring device, and clamped shut to prevent it from opening after a catch has been made.

In operation, an animal becomes ensnared by the foot when it reaches through the top opening and through the snare loop to grab the bait. When the bait is pulled upward, the trigger mechanism is actuated, thereby swinging upward and causing the release of the rotation arm of the torsion spring. The torsion spring, in an attempt to revert back to its relaxed position, pulls back the snare cable with it and closes the snare loop tightly around the leg of the animal. Furthermore, the spring lock keeps the animal from pulling its leg and the cable out of the casing, thereby precluding the animal from chewing either its snared leg or the cable.

The invention will be more fully understood from the following more detailed description taken in conjunction with the accompanying drawing.

BRIEF DESCRIPTION OF THE DRAWINGS

FIG. 3 is a side elevational view of the device shown in FIG. 2 as activated in response to the animal retrieving bait and attempting to withdraw from the device;

FIG. 4 is a side elevational view of the device shown in FIG. 3 after the torsion spring has returned to its relaxed position and the snare loop has closed tightly around the leg of the animal;

DETAILED DESCRIPTION OF THE INVENTION

Figure 1:
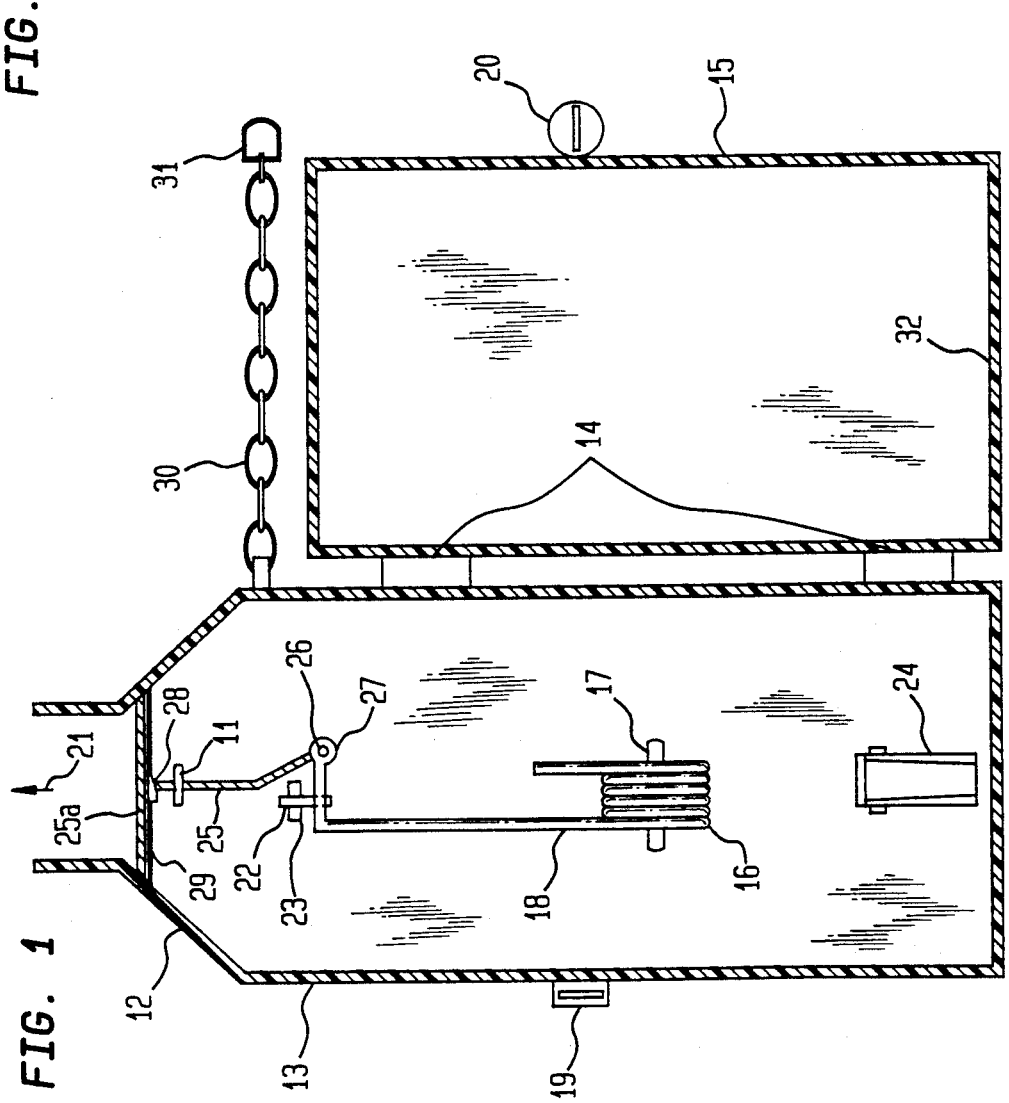
FIG. 1 is a front elevational view of the animal leg snare device in the set position in accordance with the invention showing the casing in the open position to expose all parts of the device.

With reference now more particularly to FIG. 1, there is shown a front elevational view of the animal leg snare device in accordance with the present invention. Shown in FIG. 1 is a 3 inch by 1.5 inch schedule 40 PVC plastic coupling 12 affixed to a 3 inch diameter, 8.5 inch long schedule 40 PVC plastic pipe 13 known as the casing. Pipe 13 is shown cut in half and hinged by means of hinges 14 to casing cover 15. As noted, in the open position, the interior of the device is exposed, thereby revealing all parts of the leg snaring assembly. Torsion spring 16 is affixed to the interior wall of one half of casing 13 by means of a modified U bolt 17. Spring 16 is constructed in such fashion that as to enable rotation arm 18 which is affixed thereto to rotate 180 degrees without striking the interior wall of casing cover 15 when it is in the closed position. Also shown is pipe clamp 19 which in combination with screw 20 keeps the device in the closed position. Opening of the casing is effected by loosening screw 20 by turning it counterclockwise. Upon opening the casing 13, the rotation arm 18 is released from the spring lock 24 and is pushed upwards towards the top opening 21 in casing 13 and is held in the "set" position by trigger 22 (see FIG. 2). Trigger 22 which is secured to the interior wall of the casing 13 is held perpendicular to the interior wall of casing 13 by the force exerted upon it by the rotation arm of torsion spring 16 when the snaring device is in the set position. When the rotation arm 18 and trigger 22 are in position, snare loop 25A is pulled through the top opening 21 of casing 13 and through cable guide 11 until the cable stop 26 impinges upon the loop 27 in rotation arm 18 and the cable is tight. At this juncture, snare loop 25A is increased in size by releasing snare lock 28 with the fingers. All of the slack present must be pulled out of the snare cable 25 in order to assure formation of the correct size snare loop. After formation of the snare loop, it is placed in reducing washer 29 below the top opening of casing 13. Trigger 22 is then baited and the casing is closed around the snaring device parts. Pipe clamp 19 is tightened around casing 13 by turning screw 20 clockwise until tight. Casing 13 acts as an attracting medium so the animal leg snare can be set above ground or buried in the ground with only the top thereof being exposed. Once set and in position, the animal leg snare is anchored to a fixed object by means of an anchor chain 30. Anchor chain 30 is equipped with swivel 31 to preclude the anchor chain from becoming twisted when a snared animal struggles to escape. The base 32 of casing 13 prevents the animal from reaching into the wrong end of the casing to secure the bait when the leg snare is set above the ground.

Figure 2:
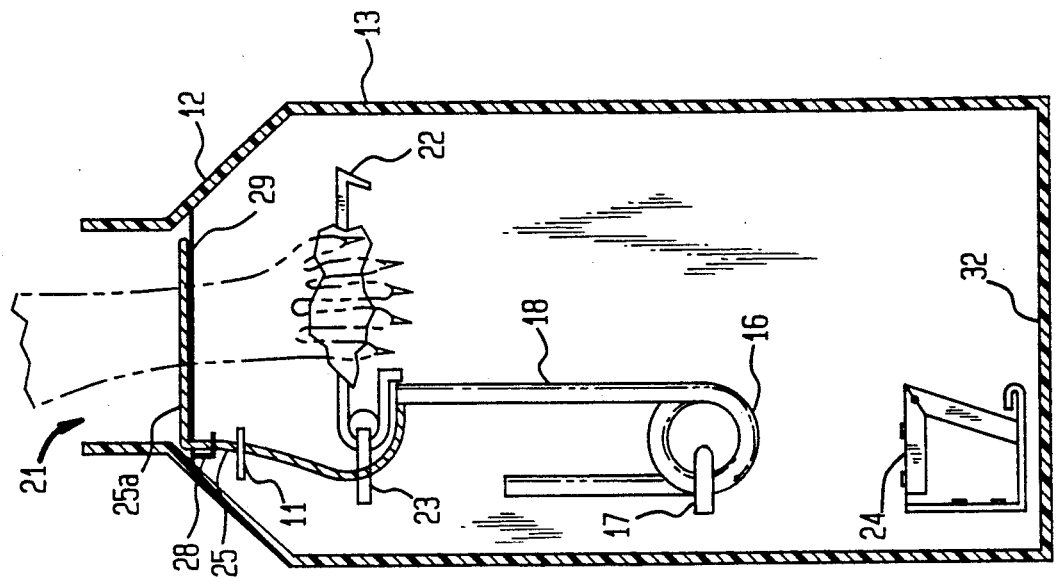
FIG. 2 is a side elevational view of the device shown in FIG. 1 depicting an animal leg reaching through the top opening of the device and snare loop to retrieve bait.

An animal is snared by the leg when it reaches through the top opening and the snare loop to grab the bait as shown in FIG. 2. When the bait is lifted upwards, trigger 22 rotates upwards and release the rotation arm 18 of torsion spring 16, as shown in FIG. 3. Torsion spring 16, no longer under tension, attempts to revert to its relaxed position. In the process, it pulls the snare cable 25 with it and the snare loop 25A closes tightly around the leg of the animal as shown in FIG. 4. The animal is then unable to pull its leg out of the casing because spring lock 24 holds rotation arm 18, with attached snare cable 25, in place, as shown in FIG. 4. Since the animal cannot pull its leg and the snare cable out of the casing, it will not be able to chew the cable and escape. Furthermore, the animal cannot cause injury to itself by chewing its foot.

The significance of the spring lock described herein will be more fully appreciated by reference to FIGS. 5 and 6 herein.

Figure 5A:
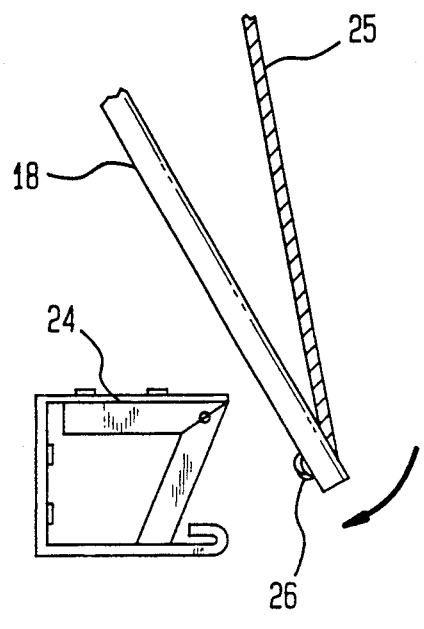
FIG. 5A is a side view of the spring lock of the inventive device, as magnified, showing the movement of the rotation arm of the torsion spring of the device as it moves downward in response to activation.
Figure 5B:
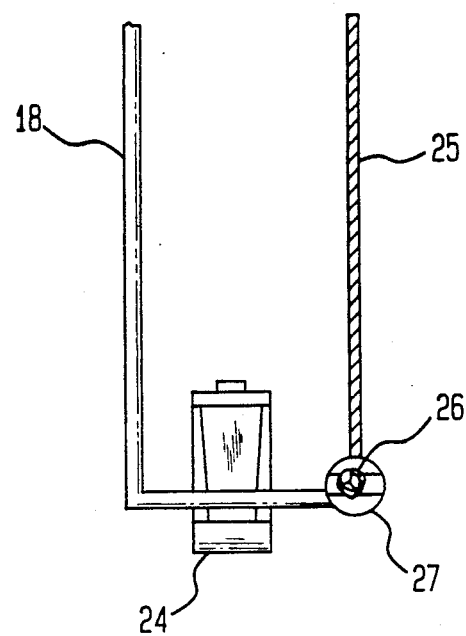
FIG. 5B is a top view of the spring lock of the invention shown in FIG. 5A.

FIG. 5A depicts a side view of spring lock 24 in which rotation arm 18 is shown following downward movement in response to activation. The spring lock 24 holds rotation arm 18 with the attached snare cable in place. In FIG. 5B, a top view of the spring lock assembly, rotation arm and snare cable of FIG. 5A is shown.

Figure 6A:
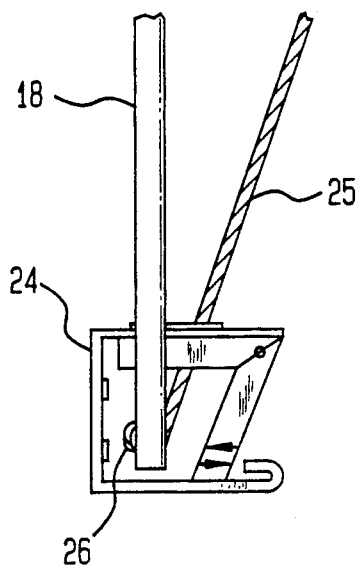
FIG. 6A is a side view of the spring lock shown in FIG. 5A after the rotation arm has snapped back to its sprung (relaxed) position where it is held and can no longer be pulled upwards, thereby ensuring that the animal cannot pull its ensnared leg from the casing.
Figure 6B:
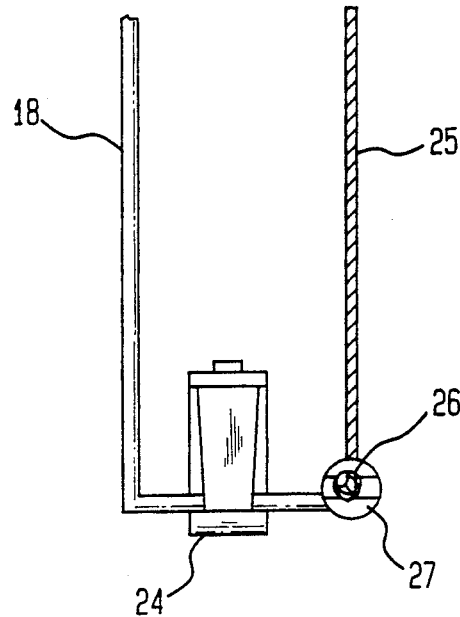
FIG. 6B is a top view of the device shown in FIG. 6A.

In FIG. 6A, there is shown a side view of spring lock 24 after rotation arm 18 has snapped back to its relaxed position where it can no longer be pulled upwards. FIG. 6B is a top view of the device shown in FIG. 6A.

It will be appreciated by those skilled in the art that variations in the described device may be made without departing from the spirit and scope of the invention. It will be further understood that the exemplary embodiments alluded to herein are for purposes of exposition only and are not to be construed as limiting.

What is claimed is:

1. A snare trap for snaring the leg of an animal comprising a spring powered cable snaring device enclosed in a tapered plastic tubing which is open at the upper end and sealed at its lower end, the snaring device comprising (a) a cable member having a stop member affixed to one end thereof and operatively connected to said stop member a sliding lock mechanism through which the cable is threaded to form a snare loop having a diameter greater than the opening at the upper end of said tubing, the snare resting inside, below and parallel with the opening at the upper end of the tubing, (b) a torsion spring affixed tot he interior wall of the plastic tubing, said spring being adapted with a rotation arm in a plane normal thereto at its distal end and being parallel with coils of said spring and further adapted with means configured in the form of a loop for attaching the cable by means of the cable stop, thereby permitting rotation of said rotation arm 180° without impinging upon the interior walls of the tubing, (c) a trigger affixed to the interior wall of the tubing by means of an eye screw which holds the rotation arm of the torsion spring when the snare is in a set position, and (d) a cable guide through which the snare cable passes and upon which the snare catches, so preventing the snare loop from being pulled into the tubing while causing the snare loop to be closed around the leg of the animal as the result of the downward motion of the rotation arm pulling the cable snare.

2. Trap in accordance with claim 1 further comprising a spring lock which maintains the rotation arm of the torsion spring in the relaxed, fully extended position after activation of the device and closure of the snare loop around the leg of an animal, thereby precluding the animal from pulling its leg and the snare cable from the casing.

3. Trap in accordance with claim 1 wherein the tubing is laterally cut and hinged to permit opening thereof so as to provide access to the snare for setting.

4. Trap in accordance with claim 1 further comprising a reducing washer affixed to the interior wall of the tubing below the upper opening to hold and conceal the snare loop after setting.

5. Trap in accordance with claim 1 wherein the diameter of the top opening of the tubing is such that a small animal's paw will not be entrapped therein.

* * * * *